(12) United States Patent
Li et al.

(10) Patent No.: US 11,485,258 B2
(45) Date of Patent: Nov. 1, 2022

(54) CHILD SAFETY SEAT

(71) Applicant: Bambino Prezioso Switzerland AG, Steinhausen (CH)

(72) Inventors: Ruyi Li, Dongguan (CN); Da Liang Zhang, Dongguan (CN)

(73) Assignee: Bambino Prezioso Switzerland AG, Steinhausen (CH)

( * ) Notice: Subject to any disclaimer, the term of this patent is extended or adjusted under 35 U.S.C. 154(b) by 0 days.

(21) Appl. No.: 17/128,462

(22) Filed: Dec. 21, 2020

(65) Prior Publication Data
US 2021/0197695 A1 Jul. 1, 2021

(30) Foreign Application Priority Data
Dec. 30, 2019 (CN) .......................... 201911396862.X

(51) Int. Cl.
*B60N 2/28* (2006.01)
(52) U.S. Cl.
CPC .......... *B60N 2/2839* (2013.01); *B60N 2/2821* (2013.01); *B60N 2/2851* (2013.01); *B60N 2/2869* (2013.01)
(58) Field of Classification Search
CPC .... B60N 2/2839; B60N 2/2869; B60N 2/995; B60N 2/62; A47C 7/5066
(Continued)

(56) References Cited

U.S. PATENT DOCUMENTS 5,505,519 A * 4/1996 Natt .......................... B60N 2/28
297/250.1

6,068,335 A 5/2000 Glover
(Continued)

FOREIGN PATENT DOCUMENTS

CN 102015362 A 4/2011
CN 110497826 A 11/2019
(Continued)

OTHER PUBLICATIONS

The Office Action and the search report in Taiwanese counterpart 109145057 dated Oct. 8, 2021, along with an English translation of the search report.
(Continued)

*Primary Examiner* — David R Dunn
*Assistant Examiner* — Tania Abraham
(74) *Attorney, Agent, or Firm* — NZ Carr Law Office PLLC

(57) ABSTRACT

A child safety seat includes a support base, a seat shell positionable on the support base, a front end part rotatable relative to the seat shell between a retracted position and a deployed position, and a latching mechanism for locking the front end part in the deployed position. The seat shell has a front end provided with an opening, and two sidewalls respectively protruding at a left and a right side of a seat portion. The front end part has a transversal portion and two side portions, the transversal portion extending along a width direction of the seat shell, and the two side portions being respectively connected pivotally with the two sidewalls of the seat shell. The transversal portion of the front end part is stowed inside the opening of the seat shell in the retracted position, and extends outside the opening of the seat shell in the deployed position.

16 Claims, 10 Drawing Sheets

(58) Field of Classification Search
USPC .................................................. 297/423.28
See application file for complete search history.

(56) References Cited

U.S. PATENT DOCUMENTS

| | | | | |
|---|---|---|---|---|
| 6,315,359 | B1 * | 11/2001 | Wetter ................. | B60N 2/2821 |
| | | | | 297/250.1 |
| 7,073,859 | B1 * | 7/2006 | Wilson ................. | B60N 2/0232 |
| | | | | 297/250.1 |
| 7,278,683 | B2 * | 10/2007 | Williams ............. | B60N 2/2851 |
| | | | | 297/250.1 |
| 7,429,083 | B2 * | 9/2008 | Tsuji ..................... | B60N 2/995 |
| | | | | 297/423.26 |
| 9,789,791 | B2 * | 10/2017 | Hutchinson .......... | B60N 2/2863 |
| 10,272,804 | B2 * | 4/2019 | Williams ............. | B60N 2/2875 |
| 10,464,450 | B1 * | 11/2019 | Peterson ................ | A47D 15/00 |
| 2017/0355287 | A1 * | 12/2017 | Anderson ............ | B60N 2/2878 |
| 2019/0061665 | A1 | 2/2019 | Kondrad et al. | |

FOREIGN PATENT DOCUMENTS

| | | | |
|---|---|---|---|
| JP | 2011195142 A | 10/2011 | |
| JP | 2017088167 A | 5/2017 | |

OTHER PUBLICATIONS

Search Report of the corresponding PCT Patent Application No. PCT/EP2020/087509 dated Mar. 12, 2021.
Office Action dated Apr. 5, 2022 in Japanese counterpart 2020-218284 along with English translation thereof.

* cited by examiner

CHILD SAFETY SEAT

CROSS-REFERENCE TO RELATED APPLICATION(S)

This application claims priority to Chinese patent application no. 201911396862.X filed on Dec. 30, 2019.

BACKGROUND

1. Field of the Invention

The present invention relates to child safety seats.

2. Description of the Related Art

A child safety seat is typically used in an automobile vehicle to properly restrain a child in the event of accidental collision. In particular, it is well known that the installation of a child safety seat in a rearward facing position can offer better protection because it allows the collision energy to be dispersed across a larger area of the child's body (i.e., the child's torso and head). Accordingly, safety experts and car seat manufacturers usually recommend to seat a child in the rearward facing position till the age of 2 years. As the child grows older, the child safety seat may be installed in the forward facing position.

Some existing child safety seats allow to rotationally adjust a child seat between the rearward facing position and the forward facing position, and can further set the child seat in a sideways facing position for facilitating retrieval or placement of a child. However, because the support base of the child safety seat is attached on a vehicle seat at a location that is usually not distant from the vehicle door, the child seat may adversely collide against the vehicle door when it rotates toward the sideways facing position.

Therefore, there is a need for an improved child safety seat that allows flexible adjustment and address at least the foregoing issues.

SUMMARY

The present application describes a child safety seat that is more flexibly adjustable and can offer a more convenient use.

According to an embodiment, the child safety seat includes a support base adapted to be installed on a vehicle seat, a seat shell positionable on the support base, a front end part rotatable relative to the seat shell between a retracted position and a deployed position, and a latching mechanism for locking the front end part in the deployed position. The seat shell has a front end, a seat portion, a backrest portion and two sidewalls, the front end having an opening, the two sidewalls respectively protruding at a left and a right side of the seat portion, whereby an interior space for receiving a child is defined at least partially between the two sidewalls. The front end part has a transversal portion and two side portions connected with the transversal portion, the transversal portion extending along a width direction of the seat shell, and the two side portions being respectively connected pivotally with the two sidewalls of the seat shell. The transversal portion of the front end part is stowed and received at least partially inside the opening of the seat shell in the retracted position, and extends outside the opening of the seat shell in the deployed position.

DETAILED DESCRIPTION OF THE EMBODIMENTS

Figure 1:
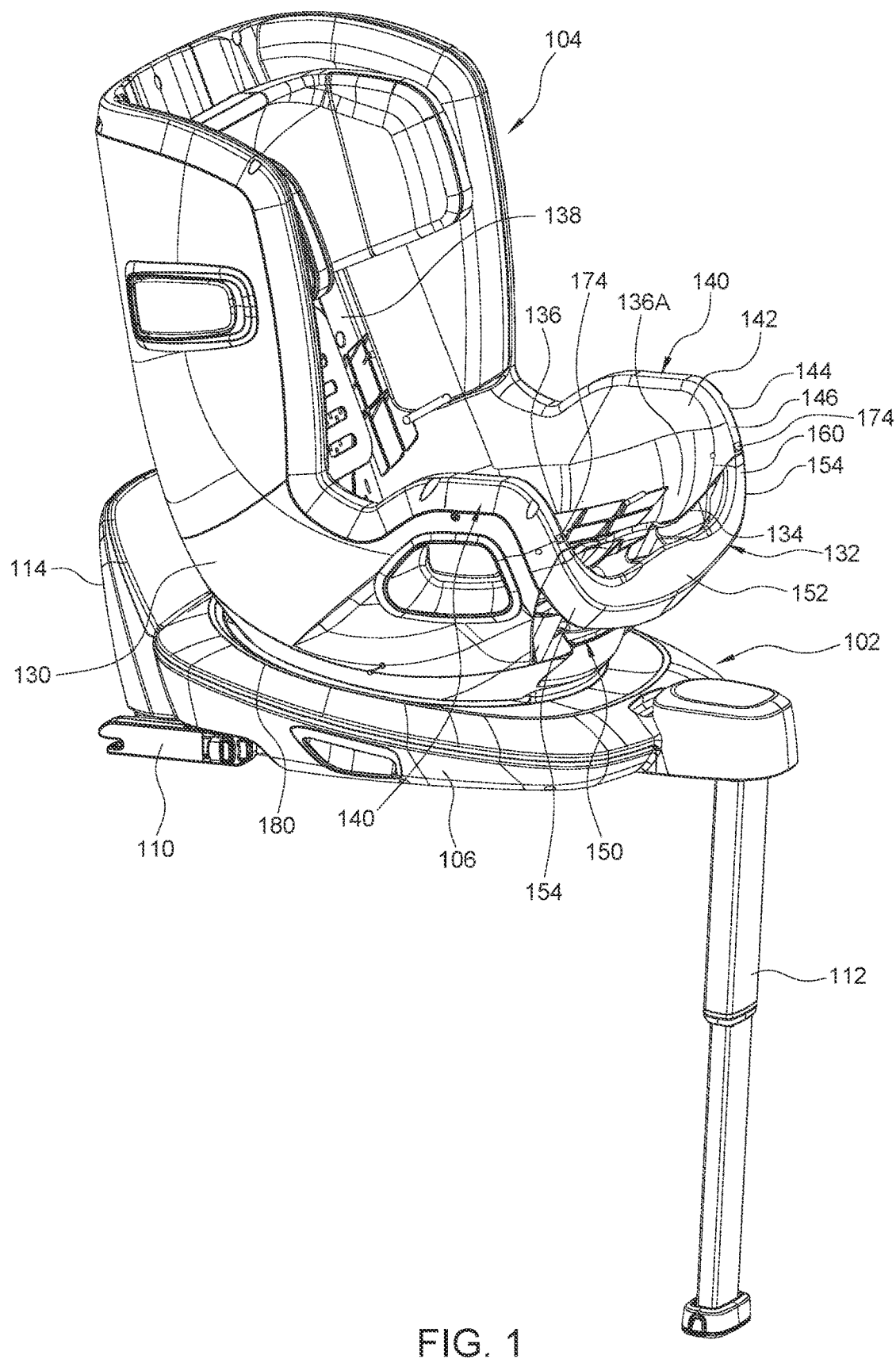
FIG. 1 is a perspective view illustrating an embodiment of a child safety seat in a forward facing position.
Figure 2:
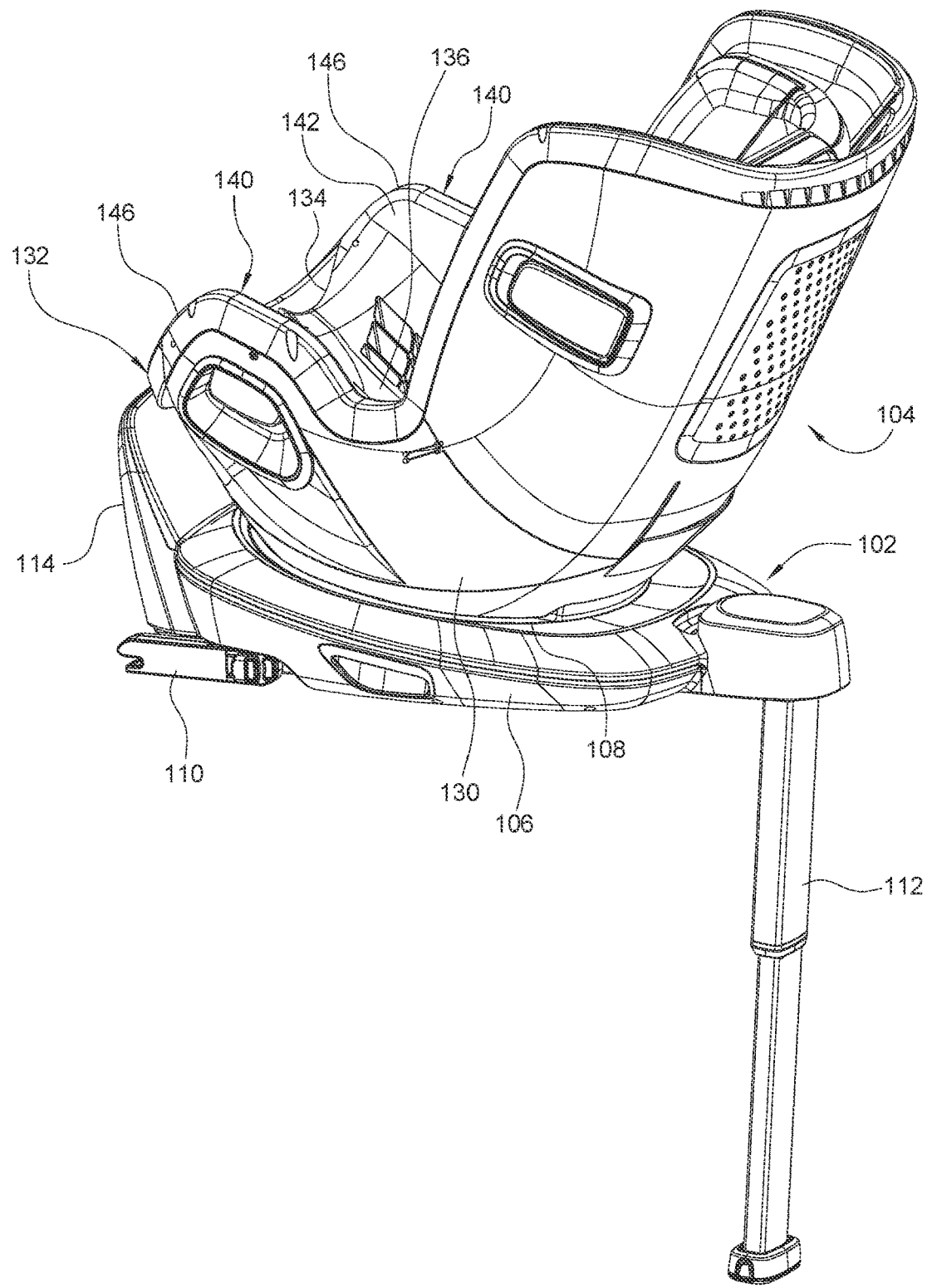
FIG. 2 is a perspective view illustrating the child safety seat in a rearward facing position.
Figure 3:
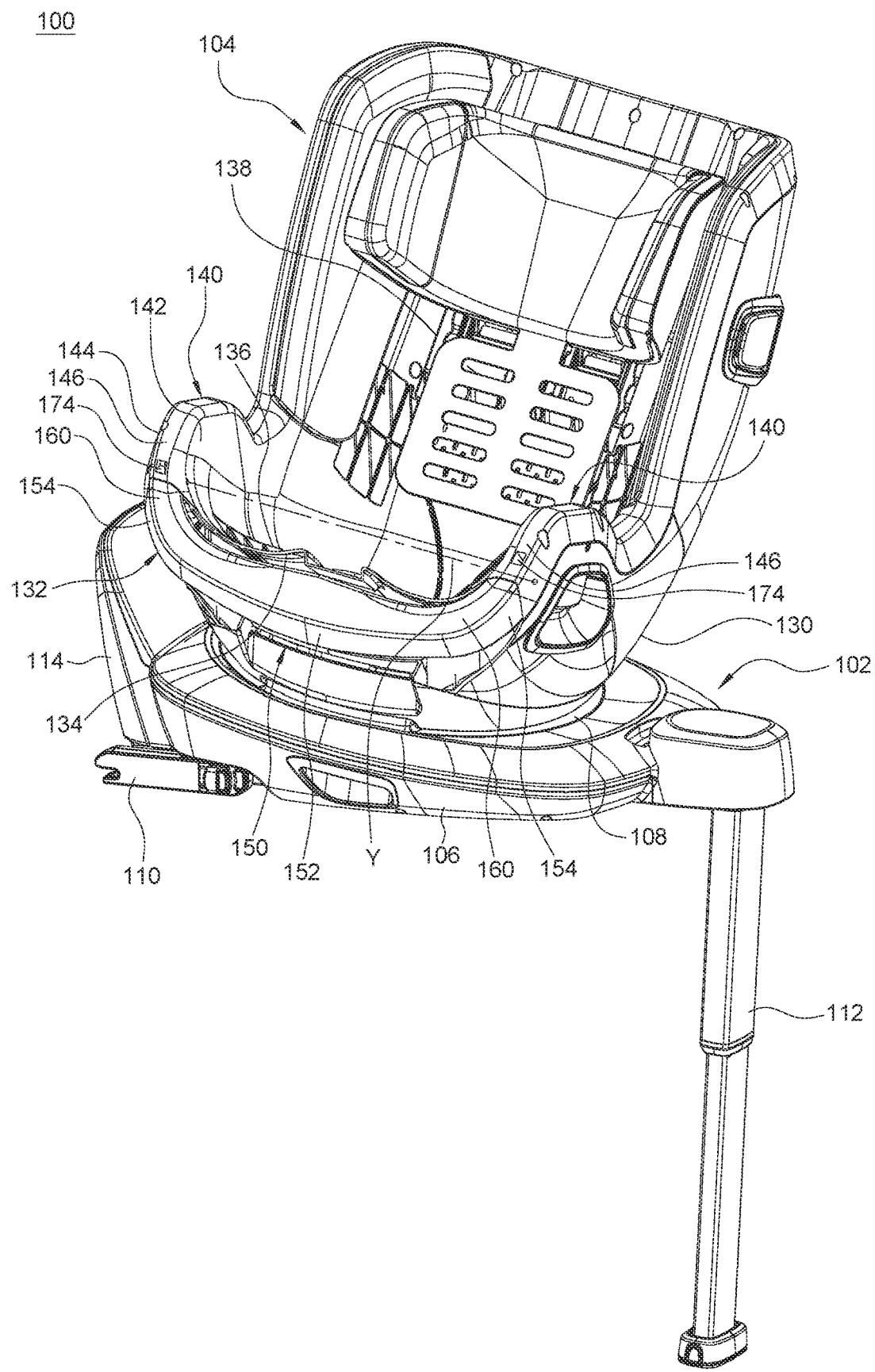
FIG. 3 is a perspective view illustrating the child safety seat in a sideways facing position.
Figure 4:
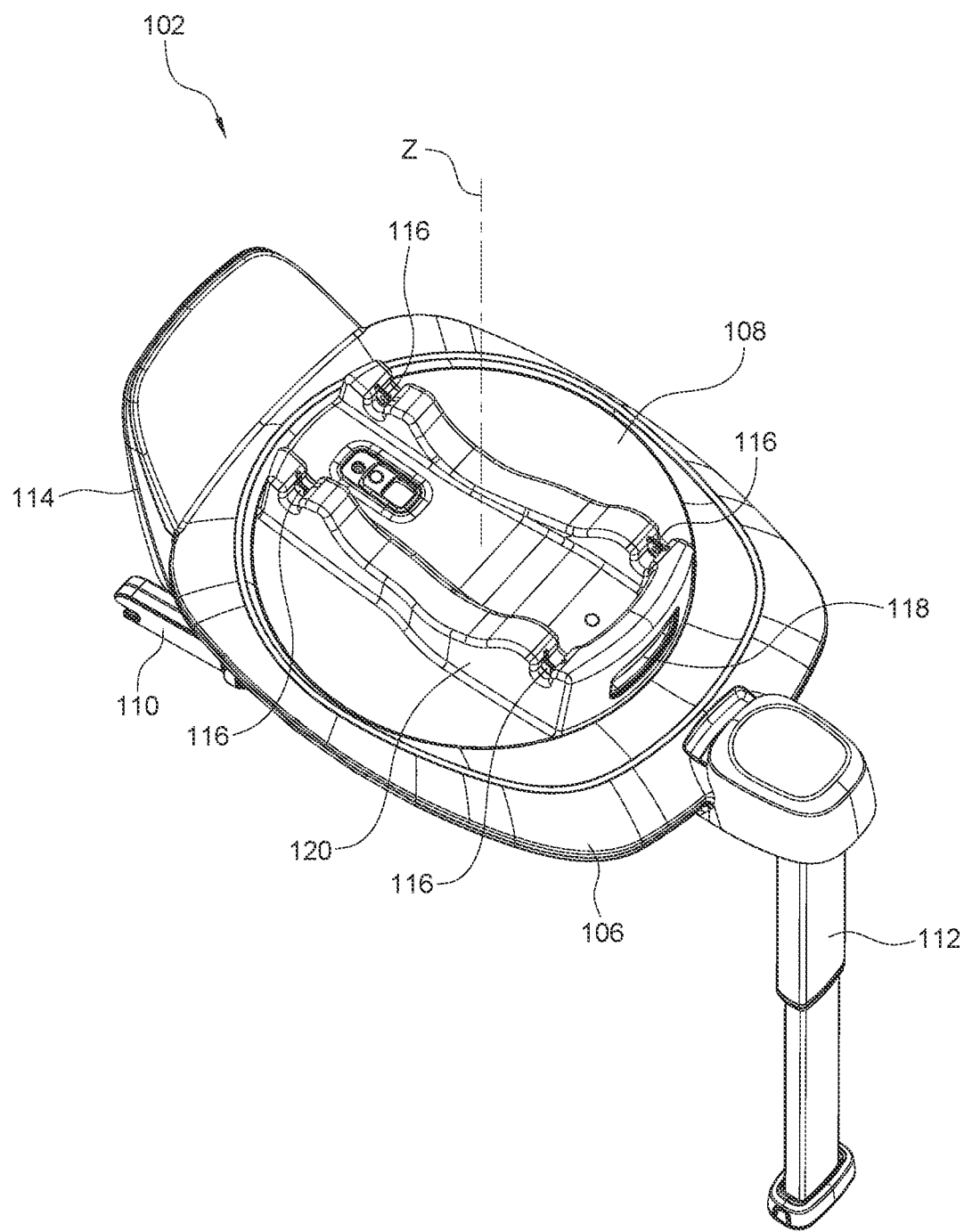
FIG. 4 is a perspective view illustrating a support base of the child safety seat.

FIGS. 1-3 are perspective views illustrating an embodiment of a child safety seat 100 in different positions. Referring to FIGS. 1-3, the child safety seat 100 includes a support base 102, and a child seat 104 disposed on the support base 102. The support base 102 is adapted to be installed on a vehicle seat, and can provide stable support for the child safety seat 100. The support base 102 can have a suitable structure for positioning the child seat 104 on the support base 102 in different orientations, such as a forward facing position shown in FIG. 1, a rearward facing position shown in FIG. 2, and a sideways facing position shown in FIG. 3.

In conjunction with FIGS. 1-3, FIG. 4 is a perspective view illustrating the support base 102. Referring to FIGS. 1-4, according to an example of construction, the support base 102 can include a shell body 106, a rotary platform 108, two latch devices 110 and a support leg 112. The shell body 106 can have an end forming a support panel 114 protruding upward. The two latch devices 110 can be assembled with the shell body 106, and can be disposed at a left and a right side of the shell body 106 adjacent to the support panel 114. The support base 102 can be installed on a vehicle seat with the support panel 114 adjacent to a seatback of the vehicle seat to provide support, and the two latch devices 110 can releasably engage with an anchor structure (e.g., ISOFIX anchor) provided in the vehicle to lock the support base 102 in place on the vehicle seat. The support leg 112 can be connected with the shell body 106 at an end thereof opposite to the end where are provided the latch devices 110, and can extend downward from a bottom of the shell body 106. In use, the support leg 112 extending from the bottom of the shell body 106 can contact against a floor of a vehicle in front of the vehicle seat on which the support base 102 is installed, which can prevent adverse rotation of the child safety seat 100 toward the front of the vehicle.

The rotary platform 108 is pivotally connected with the shell body 106 about a pivot axis Z, and is adapted to receive the installation of the child seat 104. The pivot axis Z can vertically pass through the rotary platform 108, and can extend vertically or slightly tilted an angle (e.g., about 10 degrees to about 15 degrees) relative to a vertical axis. The rotary platform 108 can be provided with a plurality of latches 116 that are operatively connected with a release actuator 118. When the child seat 104 is installed on the rotary platform 108, the latches 116 can engage with the child seat 104 so that the child seat 104 and the rotary platform 108 are locked to each other. The release actuator 118 is operable to cause the latches 116 to move and disengage from the child seat 104 for removing the child seat 104 from the rotary platform 108. According to an example of construction, the rotary platform 108 can have a protruding portion 120, and four latches 116 can be provided on the protruding portion 120.

After they are locked to each other, the child seat 104 and the rotary platform 108 can rotate in unison about the pivot axis Z relative to the shell body 106, whereby the child seat 104 can be positioned in different orientations. For example, FIG. 1 illustrates the child seat 104 and the rotary platform 108 in a forward facing position, FIG. 2 illustrates the child seat 104 and the rotary platform 108 in a rearward facing position, and FIG. 3 illustrates the child seat 104 and the rotary platform 108 in a sideways facing position. When the child safety seat 100 is installed in the forward facing position on a vehicle seat, a child can sit on the child seat 104 facing a forward direction of the vehicle. When the child safety seat 100 is installed in the rearward facing position on a vehicle seat, a child can sit on the child seat 104 facing the seatback of the vehicle seat. When the child safety seat 100 is set in the sideways facing position, a child can sit on the child seat 104 facing a door of the vehicle. An angular displacement between the forward facing position and the sideways facing position can be about 90 degrees, and an angular displacement between the rearward facing position and the sideways facing position can also be about 90 degrees.

The support base 102 may include a plurality of latching parts (not shown) for locking the child seat 104 and the rotary platform 108 in any of the forward facing position, the rearward facing position and the sideways facing position. For example, the shell body 106 can be assembled with a plurality of latching parts operable to move upward for locking engagement with the rotary platform 108 and downward for disengaging from the rotary platform 108.

Figure 5:
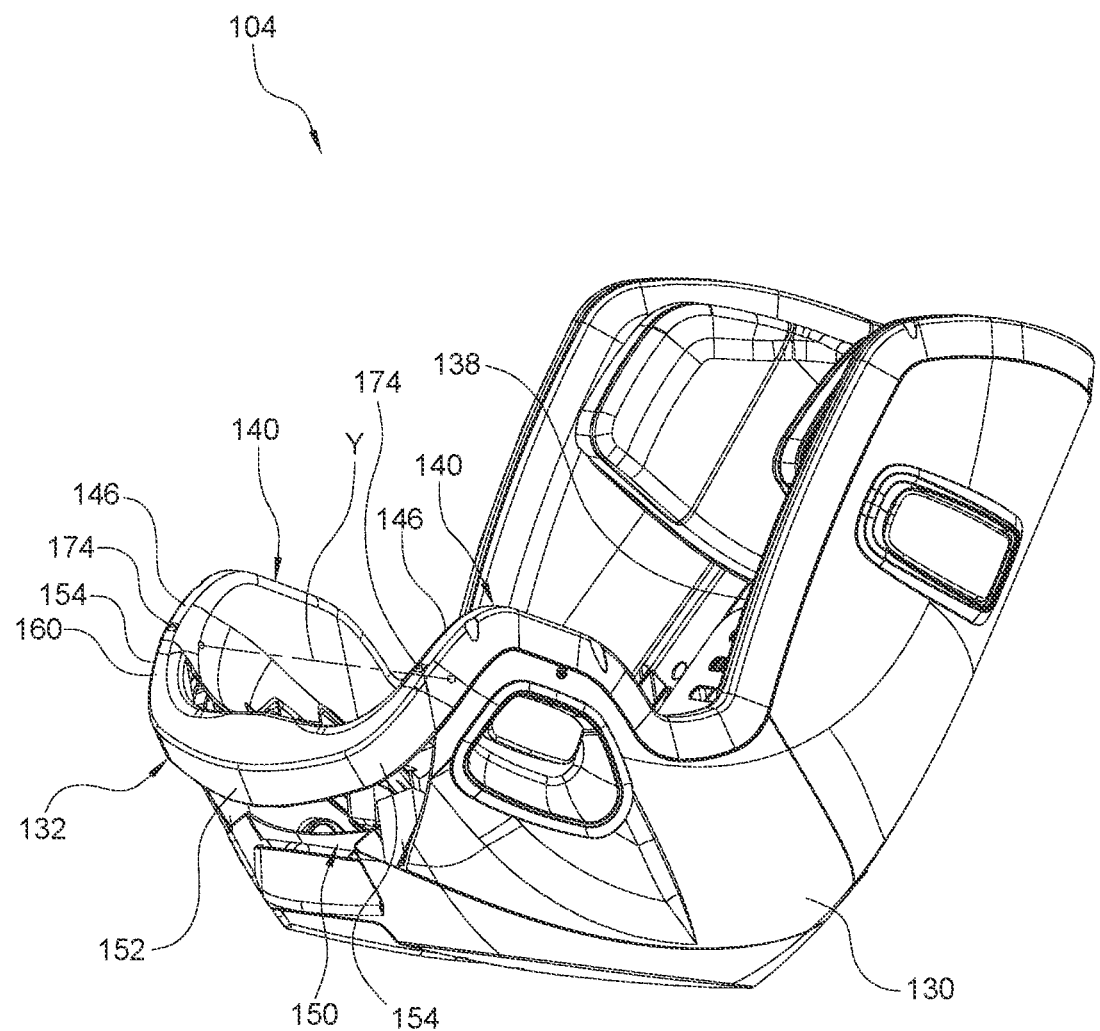
FIG. 5 is a perspective view illustrating a child seat of the child safety seat.
Figure 6:
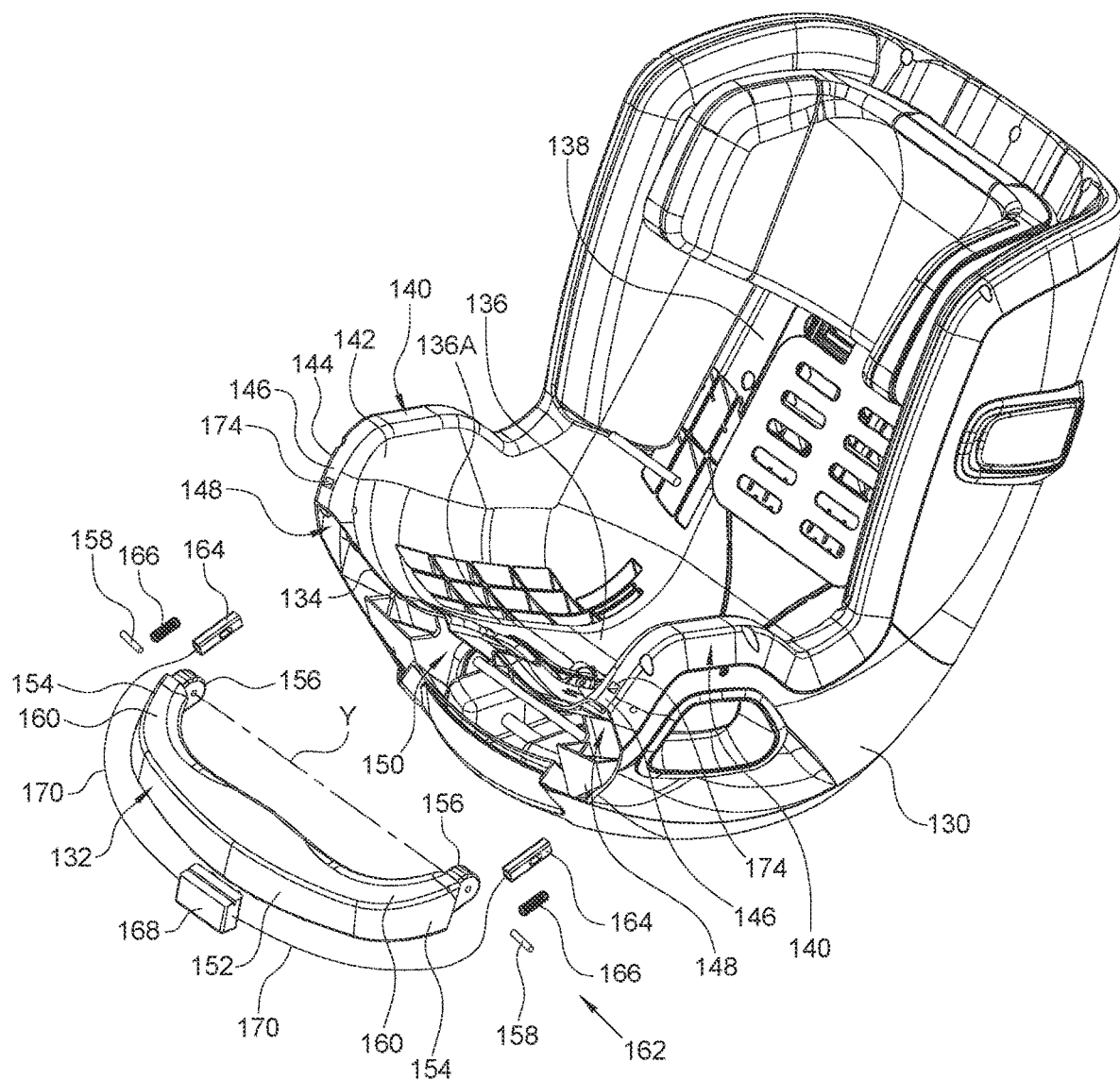
FIG. 6 is a partially exploded view illustrating some construction details of the child seat.

In conjunction with FIGS. 1-4, FIG. 5 is a perspective view illustrating the child seat 104, and FIG. 6 is a partially exploded view illustrating some construction details of the child seat 104. Referring to FIGS. 1-6, the child seat 104 includes a seat shell 130, and a retractable front end part 132. The seat shell 130 can be installed on the support base 102, e.g., by engaging a bottom structure of the seat shell 130 with the rotary platform 108 of the support base 102. Once they are locked to each other, the seat shell 130 and the rotary platform 108 can rotate in unison relative to the shell body 106 so that the seat shell 130 can be positioned in different orientations, such as the forward facing position of FIG. 1, the rearward facing position of FIG. 2, and the sideways facing position of FIG. 3.

The seat shell 130 can have a front end 134, a seat portion 136, a backrest portion 138 and two sidewalls 140. The seat portion 136 can extend between the front end 134 and the backrest portion 138, and the two sidewalls 140 can respectively protrude upward from the seat portion 136 at a left and a right side thereof. An interior space of the seat shell 130 suitable for receiving a child can be defined at least partially between the two sidewalls 140.

Each sidewall 140 can have a hollow structure, which can include two opposite sidewall surfaces 142 and 144, a sidewall edge 146, and an inner cavity 148 (better shown in FIGS. 6-8) between the two sidewall surfaces 142 and 144. More specifically, the sidewall surface 142 can face the interior space of the seat shell 130, and the sidewall surface 144 can face an outer side of the seat shell 130. The sidewall edge 146 can be located above the seat portion 136, can be respectively connected with the two sidewall surfaces 142 and 144, and can extend to the front end 134 of the seat shell 130 with an inclination so that a front portion of the sidewall edge 146 can face forward. The inner cavity 148 of the sidewall 140 can be delimited at least partially by the two sidewall surfaces 142 and 144 and the sidewall edge 146.

Referring to FIGS. 5 and 6, the front end 134 of the seat shell 130 can have an opening 150, which can extend transversally relative to the seat shell 130 and can be respectively connected with the inner cavities 148 of the two sidewalls 140. The front end part 132 can be pivotally connected with the seat shell 130, whereby the front end part 132 can rotate relative to the seat shell 130 between a deployed position and a retracted position. In the deployed position, the front end part 132 can extend outside the opening 150, and can project forward and downward. In the retracted position, the front end part 132 can be stowed and received at least partially inside the opening 150. More specifically, the front end part 132 can have a transversal portion 152 and two side portions 154, the transversal portion 152 extending along a width direction of the seat shell 130. According to an example of construction, the transversal portion 152 can have a curved shape. The two side portions 154 can be respectively connected with the transversal portion 152, and can bend from the transversal portion 152 symmetrical to each other. According to an example of construction, the front end part 132 including the transversal portion 152 and the two side portions 154 can be formed integrally as a single part.

The two side portions 154 of the front end part 132 are respectively connected pivotally with the two sidewalls 140 of the seat shell 130, whereby the front end part 132 can rotate relative to the seat shell 130 between the deployed position and the retracted position. According to an example of construction, each side portion 154 may have a coupling end 156, wherein the coupling end 156 can be fixedly connected with and protrude outward from the side portion 154. The coupling ends 156 of the two side portions 154 can be respectively disposed inside the inner cavities 148 of the two sidewalls 140, and can be respectively connected pivotally with the two sidewalls 140 via two pivot shafts 158. The front end part 132 is thereby pivotally connected with the two sidewalls 140 about a pivot axis Y defined by the pivot shafts 158, which can be located above the seat portion 136. Each side portion 154 can have a width that is smaller than a width of the inner cavity 148 at a location adjacent to the sidewall 140, whereby the side portion 154 can be retracted at least partially into the inner cavity 148 of the sidewall 140 when the front end part 132 is in the retracted position.

FIG. 5 illustrates the front end part 132 of the child seat 104 in the deployed position. In the deployed position, the transversal portion 152 of the front end part 132 can extend outside the opening 150 of the seat shell 130 and can be positioned in front of the seat portion 136. Moreover, each side portion 154 of the front end part 132 can form a smooth profile extension relative to the sidewall 140 adjacent thereto that projects forward and downward from the opening 150. For example, each side portion 154 can have a front surface 160 that inclines forward and downward and forms a generally smooth profile extension from the sidewall edge 146 of the sidewall 140 adjacent thereto. The front end part 132 can provide support for the feet or legs of a child in the deployed position.

Figure 8:
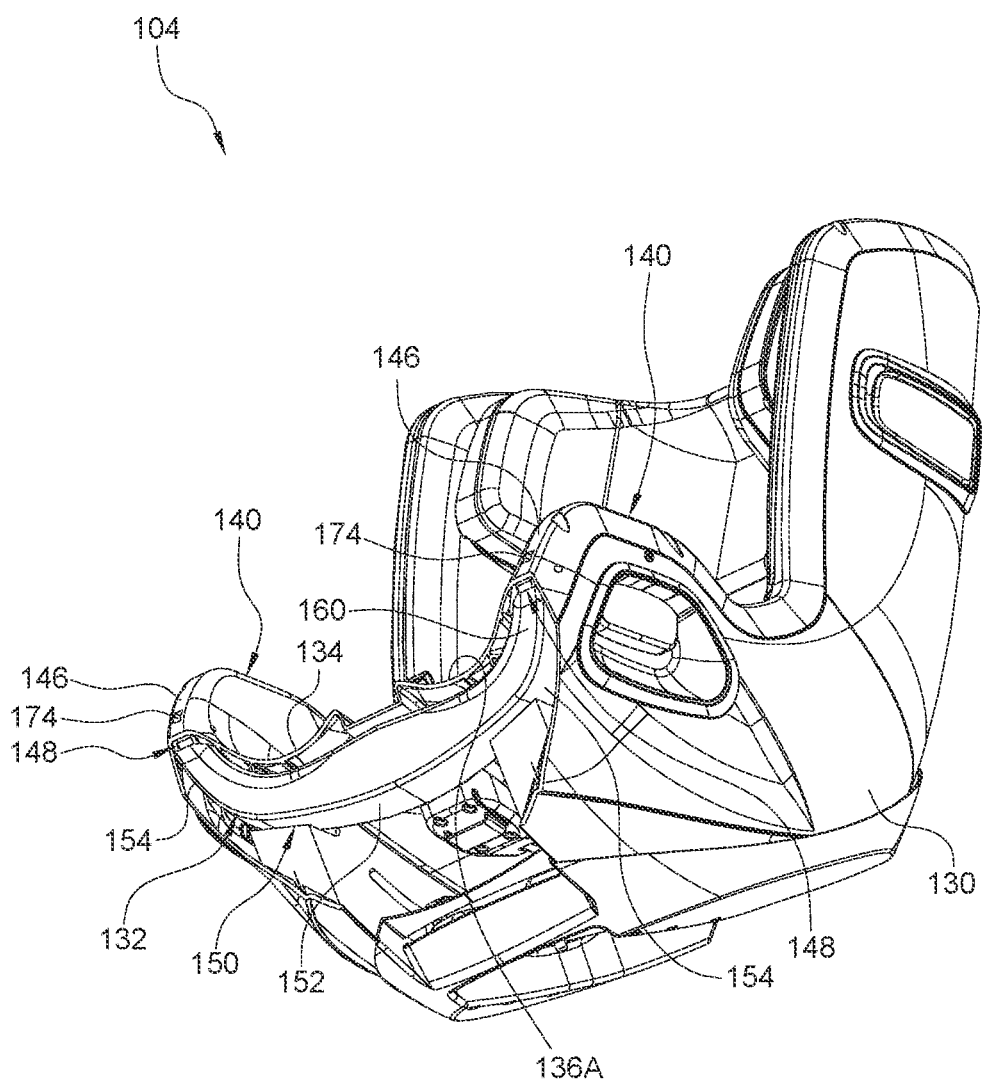
FIG. 8 is a perspective view illustrating the child seat with a front end part thereof in a retracted position.

FIG. 8 illustrates the front end part 132 of the child seat 104 in the retracted position. In the retracted position, the transversal portion 152 of the front end part 132 can be stowed and received at least partially inside the opening 150 of the seat shell 130, and more particularly can be positioned in a hollow interior of the seat portion 136 below an upper surface 136A of the seat portion 136. Moreover, the two side portions 154 of the front end part 132 can be respectively received at least partially inside the inner cavities 148 of the two sidewalls 140, whereby the front surface 160 of each side portion 154 can form an angle with respect to the sidewall edge 146 of the sidewall 140 adjacent thereto.

Figure 7:
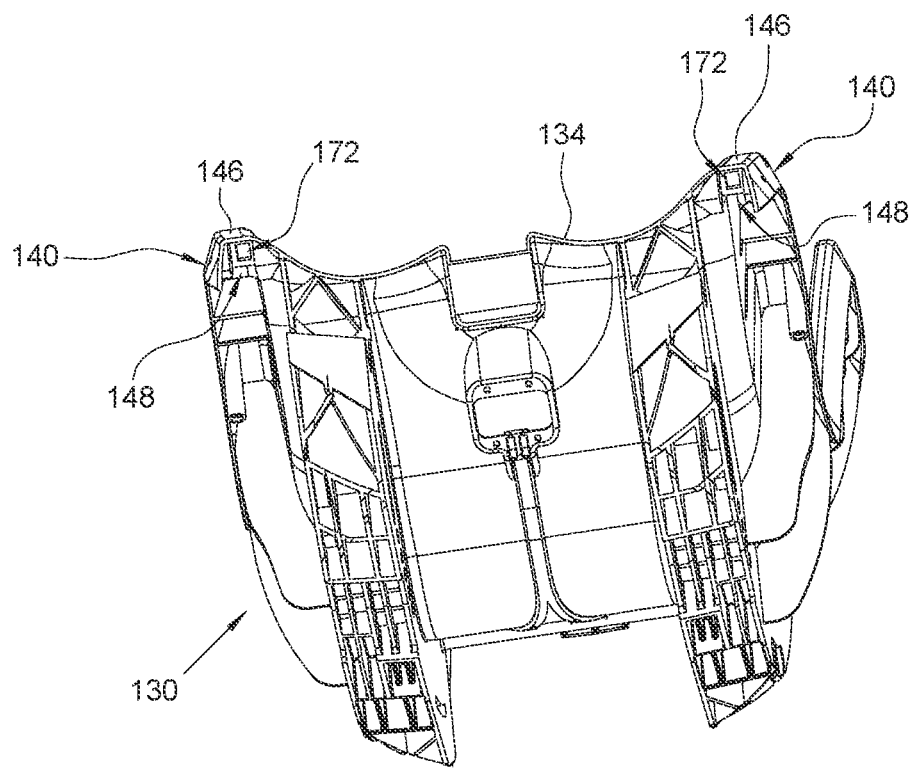
FIG. 7 is a perspective view illustrating some inner construction details of a seat shell of the child seat.

In conjunction with FIGS. 5 and 6, FIG. 7 is a perspective view illustrating some inner construction details of the seat shell 130. For the sake of clarity, FIG. 7 omits the representation of the front end part 132. Referring to FIGS. 5-7, the child seat 104 can further include a latching mechanism 162 for locking the front end part 132 in the deployed position. The latching mechanism 162 can include two latches 164, two springs 166, a release actuator 168 and two cables 170. The two latches 164 can be respectively connected with the coupling ends 156 of the two side portions 154, and can move relative to the front end part 132 to engage with or disengage from the seat shell 130. For example, each latch 134 can engage with a locking opening 172 provided in the seat shell 130 for locking the front end part 132 in the deployed position, wherein the locking opening 172 can be exemplarily placed inside the inner cavity 148 of the sidewall 140. According to an example of construction, each latch 164 can be slidably connected with the coupling end 156 of the side portion 154 associated therewith, and can slide relative to the front end part 132 to engage with or disengage from the seat shell 130. The two springs 166 can be respectively connected with the two latches 164, and can respectively bias the two latches 164 to move for engaging with the seat shell 130. The release actuator 168 can be assembled with the front end part 132, and can be respectively connected with the two latches 164 via the two cables 170. According to an example of construction, the release actuator 168 can be provided on the transversal portion 152 of the front end part 132. The release actuator 168 is operable by a caregiver to urge the two latches 164 to move and disengage from the seat shell 130, whereby the front end part 132 can be unlocked for adjustment between the deployed position and the retracted position.

According to an embodiment, the latching mechanism 162 can further be configured to lock the front end part 132 in the retracted position. For example, each latch 164 can engage with another locking opening 174 provided in the seat shell 130 for locking the front end part 132 in the retracted position. Referring to FIGS. 1, 3, 5, 6 and 8, the locking opening 174 can be exemplarily provided on the sidewall edge 146.

Figure 9:
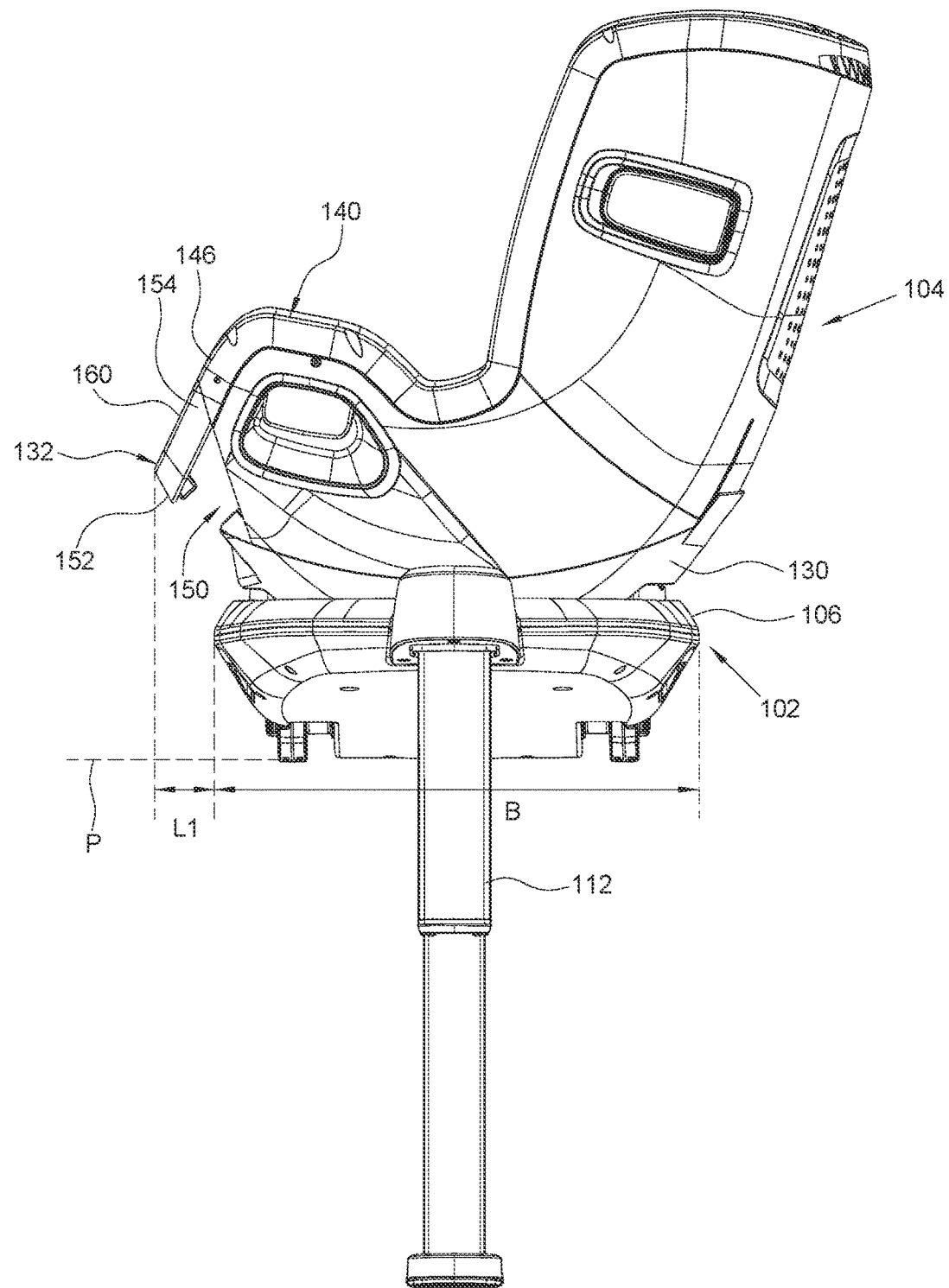
FIG. 9 is a schematic view illustrating a configuration of the child safety seat where the seat shell is in the sideways facing position and the front end part in a deployed position.
Figure 10:
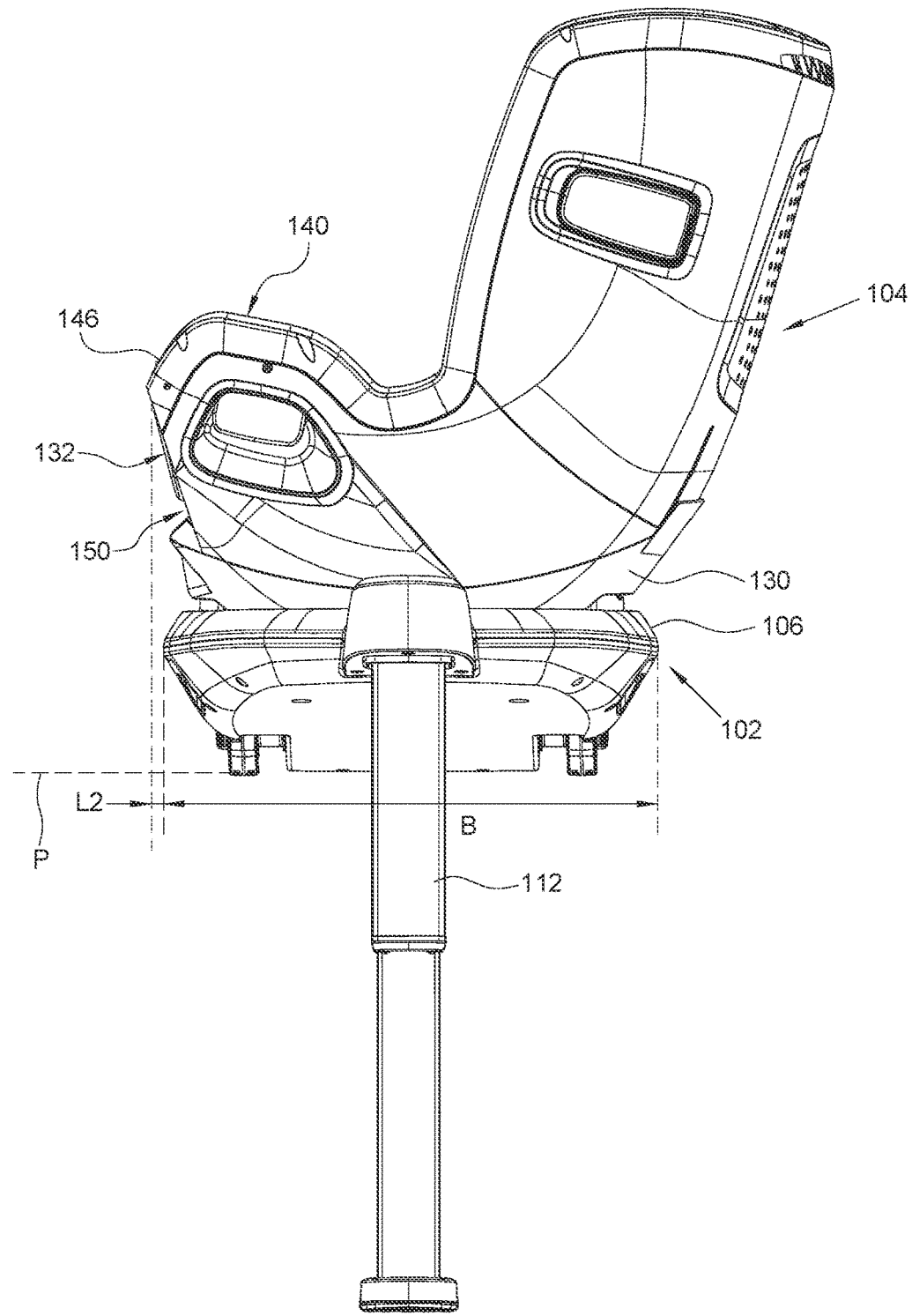
FIG. 10 is a schematic view illustrating a configuration of the child safety seat where the seat shell is in the sideways facing position and the front end part in the retracted position.

In conjunction with FIGS. 1-8, FIG. 9 is a schematic view illustrating the child safety seat 100 with the seat shell 130 in the sideways facing position and the front end part 132 in the deployed position, and FIG. 10 is a schematic view illustrating the child safety seat 100 with the seat shell 130 in the sideways facing position and the front end part 132 in the retracted position. Referring to FIG. 9, when the seat shell 130 is in the sideways facing position on the support base 102 and the front end part 132 in the deployed position, the front end part 132 can sideways protrude a distance L1 from the support base 102. More specifically, an image projection of the front end part 132 on a bottom plane P of the support base 102 can protrude the distance L1 from an image projection B of the support base 102 on the bottom plane P.

Referring to FIG. 10, when the seat shell 130 is in the sideways facing position on the support base 102 and the front end part 132 in the retracted position, the front end part 132 can sideways protrude a distance L2 from the support base 102, wherein the distance L2 can be substantially smaller than the distance L1 because the transversal portion 152 of the front end part 132 can be generally positioned in the hollow interior of the seat portion 136. According to an example of construction, the distance L2 can be equal to or smaller than about half the distance L1. According to another example of construction, an image projection of the front end part 132 on the bottom plane P of the support base 102 can be within the boundary of the image projection B of the support base 102 on the bottom plane P when the seat shell 130 is in the sideways facing position on the support base 102 and the front end part 132 in the retracted position. Accordingly, when the child safety seat 100 is used inside a vehicle, a caregiver can first adjust the front end part 132 to the retracted position, and then rotate the child seat 104 from the forward or rearward facing position to the sideways facing position for retrieving a child from the child seat 104 or placing a child on the child seat 104. With the front end part 132 in the retracted position, collision between the child seat 104 (in particular the front end part 132 thereof) and a door of the vehicle can be prevented as the child seat 104 rotates to the sideways facing position.

Advantages of the structures described herein include the ability to provide a child safety seat that is adjustable to different orientations as needed and has a front end part retractable to prevent undesirable interference with a vehicle environment during the adjustment of the child safety seat. Accordingly, the child safety seat can be more flexible and convenient in use.

Realization of the child safety seat has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat comprising:
   a support base adapted to be installed on a vehicle seat;
   a seat shell positionable on the support base, the seat shell having a front end, a seat portion, a backrest portion and two sidewalls, the front end having an opening, the two sidewalls respectively protruding at a left and a right side of the seat portion, whereby an interior space for receiving a child is defined at least partially between the two sidewalls, wherein each of the two sidewalls has an inner cavity, two opposite sidewall surfaces and a sidewall edge, one of the two sidewall surfaces facing the interior space of the seat shell and the other one of the two sidewall surfaces facing an outer side of the seat shell, the sidewall edge being located above the seat portion and respectively connected with the two sidewall surfaces, the sidewall edge extending to the front end of the seat shell, the inner cavity of each of the two sidewalls being delimited at least partially by the two sidewall surfaces and the sidewall edge thereof;
   a retractable front end part, having a transversal portion and two side portions connected with the transversal portion, the transversal portion extending along a width direction of the seat shell, and the two side portions being respectively connected pivotally with the two sidewalls of the seat shell, whereby the front end part is rotatable relative to the seat shell between a retracted position and a deployed position, the transversal portion of the front end part being stowed and received at least partially inside the opening of the seat shell and the two side portions of the front end part being respectively received at least partially inside the inner cavities of the two sidewalls in the retracted position, and the transversal portion of the front end part extending outside the opening of the seat shell in the deployed position, wherein each of the two side portions has a front surface that inclines forward and downward and forms a profile extension from the sidewall edge of the sidewall adjacent thereto in the deployed position, the front surface forming an angle with respect to the sidewall edge of the sidewall adjacent thereto in the retracted position; and a latching mechanism for locking the front end part in the deployed position.

2. The child safety seat according to claim 1, wherein the front end part including the transversal portion and the two side portions is formed integrally as a single part.

3. The child safety seat according to claim 1, wherein the two side portions bend from the transversal portion symmetrical to each other.

4. The child safety seat according to claim 1, wherein the front end part is pivotally connected with the two sidewalls about a pivot axis that is located above the seat portion.

5. The child safety seat according to claim 1, wherein each of the two side portions has a coupling end, the coupling ends of the two side portions being respectively disposed inside the inner cavities of the two sidewalls and respectively connected pivotally with the two sidewalls via two pivot shafts.

6. The child safety seat according to claim 5, wherein the latching mechanism includes two latches respectively connected with the coupling ends of the two side portions, the two latches being movable relative to the front end part for engaging with or disengaging from the seat shell.

7. The child safety seat according to claim 6, wherein the two latches are respectively connected slidably with the coupling ends of the two side portions, whereby the two latches are slidable relative to the front end part for engaging with or disengaging from the seat shell.

8. The child safety seat according to claim 6, wherein the latching mechanism further includes two springs respectively connected with the two latches, the two springs respectively biasing the two latches to move for engaging with the seat shell.

9. The child safety seat according to claim 6, wherein the latching mechanism further includes a release actuator and two cables, the release actuator being assembled with the front end part and respectively connected with the two latches via the two cables, the release actuator being operable to urge the two latches to move and disengage from the seat shell.

10. The child safety seat according to claim 9, wherein the release actuator is provided on the transversal portion of the front end part.

11. The child safety seat according to claim 1, wherein the support base includes a shell body and a rotary platform pivotally connected with each other, the seat shell and the rotary platform being rotatable in unison relative to the shell body so that the seat shell is positionable in different orientations, including a forward facing position, a rearward facing position and a sideways facing position.

12. The child safety seat according to claim 11, wherein the front end part sideways protrudes a first distance from the support base when the seat shell is in the sideways facing position on the support base and the front end part is in the deployed position, and the front end part sideways protrudes a second distance from the support base when the seat shell is in the sideways facing position on the support base and the front end part is in the retracted position, the second distance being equal to or smaller than about half the first distance.

13. A child safety seat comprising:

a support base adapted to be installed on a vehicle seat;

a seat shell positionable on the support base, the seat shell having a front end, a seat portion, a backrest portion and two sidewalls, the front end having an opening, the two sidewalls respectively protruding at a left and a right side of the seat portion, whereby an interior space for receiving a child is defined at least partially between the two sidewalls;

a retractable front end part, having a transversal portion and two side portions connected with the transversal portion, the transversal portion extending along a width direction of the seat shell, and the two side portions being respectively connected pivotally with the two sidewalls of the seat shell, whereby the front end part is rotatable relative to the seat shell between a retracted position and a deployed position, the transversal portion of the front end part being stowed and received at least partially inside the opening of the seat shell in the retracted position, and the transversal portion of the front end part extending outside the opening of the seat shell in the deployed position; and a latching mechanism for locking the front end part in the deployed position;

wherein each of the two sidewalls has an inner cavity, each of the two side portions has a coupling end, the coupling ends of the two side portions being respectively disposed inside the inner cavities of the two sidewalls and respectively connected pivotally with the two sidewalls, and the latching mechanism includes two latches respectively connected with the coupling ends of the two side portions, the two latches being movable relative to the front end part for engaging with or disengaging from the seat shell; and wherein the seat shell is adjustable relative to the support base to a forward facing position, a rearward facing position and a sideways facing position, the front end part sideways protruding a first distance from the support base when the seat shell is in the sideways facing position and the front end part in the deployed position, and the front end part sideways protruding a second distance from the support base when the seat shell is in the sideways facing position and the front end part in the retracted position, the second distance being smaller than the first distance.

14. The child safety seat according to claim 13, wherein the second distance is equal to or smaller than about half the first distance.

15. The child safety seat according to claim 13, wherein the front end part is pivotally connected with the two sidewalls about a pivot axis that is located above the seat portion.

16. The child safety seat according to claim 13, wherein the two side portions bend from the transversal portion symmetrical to each other.

* * * * *